US008851946B2

(12) United States Patent
Kuriyagawa et al.

(10) Patent No.: US 8,851,946 B2
(45) Date of Patent: Oct. 7, 2014

(54) OUTBOARD MOTOR CONTROL APPARATUS

(75) Inventors: Koji Kuriyagawa, Saitama (JP); Hajime Yoshimura, Saitama (JP); Nobuchika Katagiri, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 261 days.

(21) Appl. No.: 13/116,124

(22) Filed: May 26, 2011

(65) Prior Publication Data

US 2011/0294375 A1 Dec. 1, 2011

(30) Foreign Application Priority Data

May 28, 2010 (JP) ................................ 2010-123292

(51) Int. Cl.

| | |
|---|---|
| ***B60W 10/06*** | (2006.01) |
| ***B60W 10/10*** | (2012.01) |
| ***B63H 21/21*** | (2006.01) |
| ***F02D 41/02*** | (2006.01) |
| ***F02D 41/10*** | (2006.01) |
| ***F02M 37/00*** | (2006.01) |
| ***F02D 11/10*** | (2006.01) |
| ***B63H 20/14*** | (2006.01) |
| *B63H 23/02* | (2006.01) |

(52) U.S. Cl.
CPC .............. *B63H 20/14* (2013.01); *F02D 41/021* (2013.01); *F02D 41/10* (2013.01); *B63H 2021/216* (2013.01); *F02M 37/0023* (2013.01); *F02D 11/105* (2013.01); *B63H 2023/0258* (2013.01); *B63H 21/21* (2013.01)
USPC ......... 440/86; 701/21; 701/87; 440/1; 440/85

(58) Field of Classification Search
CPC ........ B63H 21/21; B63H 21/22; B63H 23/02; B63H 23/04; F02D 11/105
USPC ......................... 440/1, 84, 86; 701/21, 84, 85
See application file for complete search history.

(56) References Cited

U.S. PATENT DOCUMENTS 4,334,425 A * 6/1982 Crane ........................ 73/114.53
6,474,298 B2 11/2002 Kanno (Continued)

FOREIGN PATENT DOCUMENTS

JP 2001-152896 A 6/2001
JP 2004-100689 A 4/2004

(Continued)

*Primary Examiner* — Lars A Olson
*Assistant Examiner* — Andrew Polay
(74) *Attorney, Agent, or Firm* — Carrier Blackman & Associates, P.C.; Joseph P. Carrier; Anne G. Sabourin

(57) ABSTRACT

In an apparatus for controlling operation of an outboard motor having an internal combustion engine and transmission, it is configured to determine whether acceleration is instructed to the engine by an operator when the gear position is the second speed, detect a slip ratio of a propeller based on theoretical velocity and actual velocity of a boat, control a throttle opening to suppress increase in the slip ratio when the acceleration is determined to be instructed, and change the gear position from the second speed to the first speed when the slip ratio is equal to or less than a first predetermined value and the change amount of the slip ratio is equal to or less than a prescribed value. With this, it becomes possible to appropriately control operation of the engine and the transmission during acceleration, thereby improving the acceleration performance of immediately after acceleration start.

8 Claims, 8 Drawing Sheets

(56) References Cited

U.S. PATENT DOCUMENTS

| | | | | |
|---|---|---|---|---|
| 6,659,815 | B2 * | 12/2003 | Motsenbocker | 440/1 |
| 6,855,014 | B2 * | 2/2005 | Kinoshita et al. | 440/1 |
| 7,762,858 | B2 * | 7/2010 | Suzuki et al. | 440/1 |
| 7,931,511 | B2 | 4/2011 | Suzuki et al. | |
| 8,016,626 | B2 * | 9/2011 | Suzuki et al. | 440/75 |
| 8,019,498 | B2 * | 9/2011 | Yamazaki et al. | 701/21 |
| 8,109,801 | B2 | 2/2012 | Suzuki et al. | |
| 8,239,113 | B2 * | 8/2012 | Doering et al. | 701/87 |
| 2009/0011665 | A1 * | 1/2009 | Sakaguchi et al. | 440/1 |
| 2009/0221193 | A1 | 9/2009 | Suzuki et al. | |

FOREIGN PATENT DOCUMENTS

| | | | |
|---|---|---|---|
| JP | 2009-196516 | A | 9/2009 |
| JP | 2009-202779 | A | 9/2009 |
| JP | 2009-202796 | A | 9/2009 |
| JP | 2009-208744 | A | 9/2009 |
| JP | 2011-126389 | A | 6/2011 |
| JP | 2011-127668 | A | 6/2011 |
| WO | WO 2013144974 | A2 * | 10/2013 |

* cited by examiner

OUTBOARD MOTOR CONTROL APPARATUS

BACKGROUND OF THE INVENTION

1. Technical Field

This invention relates to an outboard motor control apparatus, particularly to an apparatus for controlling an outboard motor with a transmission.

2. Background Art

In recent years, there is proposed a technique for an outboard motor having a transmission interposed at a power transmission shaft between an internal combustion engine and a propeller to change an output of the engine in speed and transmit it to the propeller, as taught, for example, by Japanese Laid-Open Patent Application No. 2009-202796. In the reference, when a throttle lever is manipulated by the operator to accelerate the boat, the gear position (gear ratio) of the transmission is changed from the second speed to the first speed to amplify torque to be transmitted to the propeller, thereby improving the acceleration performance.

SUMMARY OF INVENTION

However, immediately after the acceleration is started upon the manipulation of the throttle lever, the propeller tends to be rotated idly because it draws in air bubbles generated therearound, whereby a grip force of the propeller becomes relatively small. If the second speed is changed to the first speed under this condition, it may rather decrease thrust of the boat disadvantageously. Thus it still leaves room for improvement in terms of the acceleration performance.

An object of this invention is therefore to overcome the foregoing drawback by providing an apparatus for controlling an outboard motor having a transmission, which apparatus can appropriately control the operation of an internal combustion engine and the transmission during acceleration, thereby improving the acceleration performance of immediately after the acceleration is started.

In order to achieve the object, this invention provides in the first aspect an apparatus for controlling operation of an outboard motor adapted to be mounted on a stern of a boat and having an internal combustion engine to power a propeller through a drive shaft and a propeller shaft, and a transmission that is installed at a location between the drive shaft and the propeller shaft, the transmission being selectively changeable in gear position to establish speeds including at least a first speed and a second speed and transmitting power of the engine to the propeller with a gear ratio determined by established speed, comprising an acceleration instruction determiner adapted to determine whether acceleration is instructed to the engine by an operator when the gear position is second speed; a slip ratio detector adapted to detect a slip ratio of the propeller based on theoretical velocity and actual velocity of the boat; a throttle opening controller adapted to control a throttle opening of the engine to suppress increase in the detected slip ratio when the acceleration is determined to be instructed; a transmission controller adapted to control the transmission to change the gear position from the second speed to the first speed when the throttle opening is controlled by the throttle opening controller, the detected slip ratio is equal to or less than a first predetermined value and a change amount of the slip ratio is equal to or less than a prescribed slip ratio change amount.

In order to achieve the object, this invention provides in the second aspect a method for controlling operation of an outboard motor adapted to be mounted on a stern of a boat and having an internal combustion engine to power a propeller through a drive shaft and a propeller shaft, and a transmission that is installed at a location between the drive shaft and the propeller shaft, the transmission being selectively changeable in gear position to establish speeds including at least a first speed and a second speed and transmitting power of the engine to the propeller with a gear ratio determined by established speed, comprising the steps of: determining whether acceleration is instructed to the engine by an operator when the gear position is second speed; detecting a slip ratio of the propeller based on theoretical velocity and actual velocity of the boat; controlling a throttle opening of the engine to suppress increase in the detected slip ratio when the acceleration is determined to be instructed; controlling the transmission to change the gear position from the second speed to the first speed when the throttle opening is controlled by the step of controlling the throttle opening, the detected slip ratio is equal to or less than a first predetermined value and a change amount of the slip ratio is equal to or less than a prescribed slip ratio change amount.

BRIEF DESCRIPTION OF DRAWINGS

The above and other objects and advantages of the invention will be more apparent from the following description and drawings in which.

DESCRIPTION OF EMBODIMENTS

Embodiments of an outboard motor control apparatus according to the invention will now be explained with reference to the attached drawings.

Figure 1:
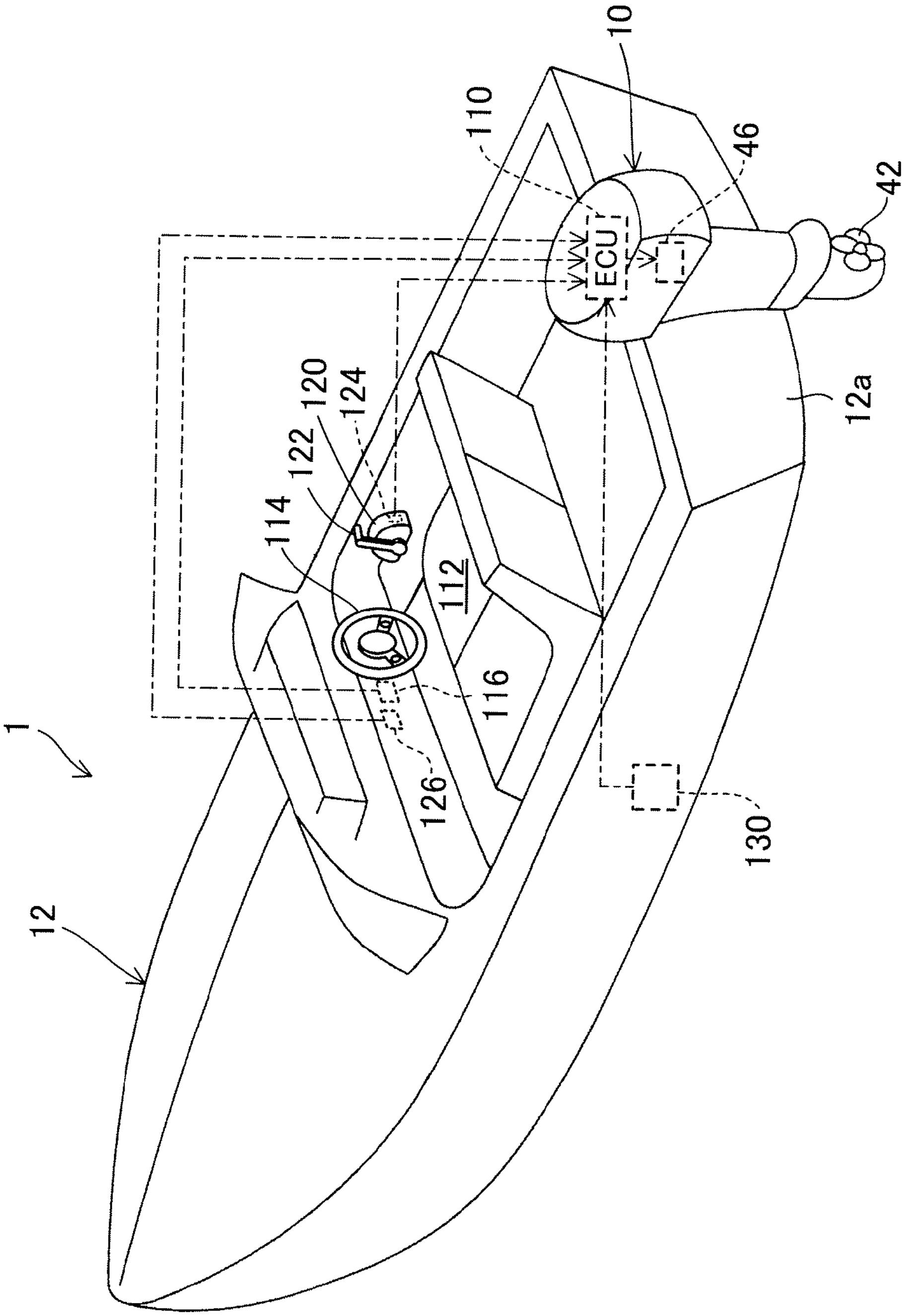
FIG. 1 is an overall schematic view of an outboard motor control apparatus including a boat according to a first embodiment of the invention.
Figure 2:
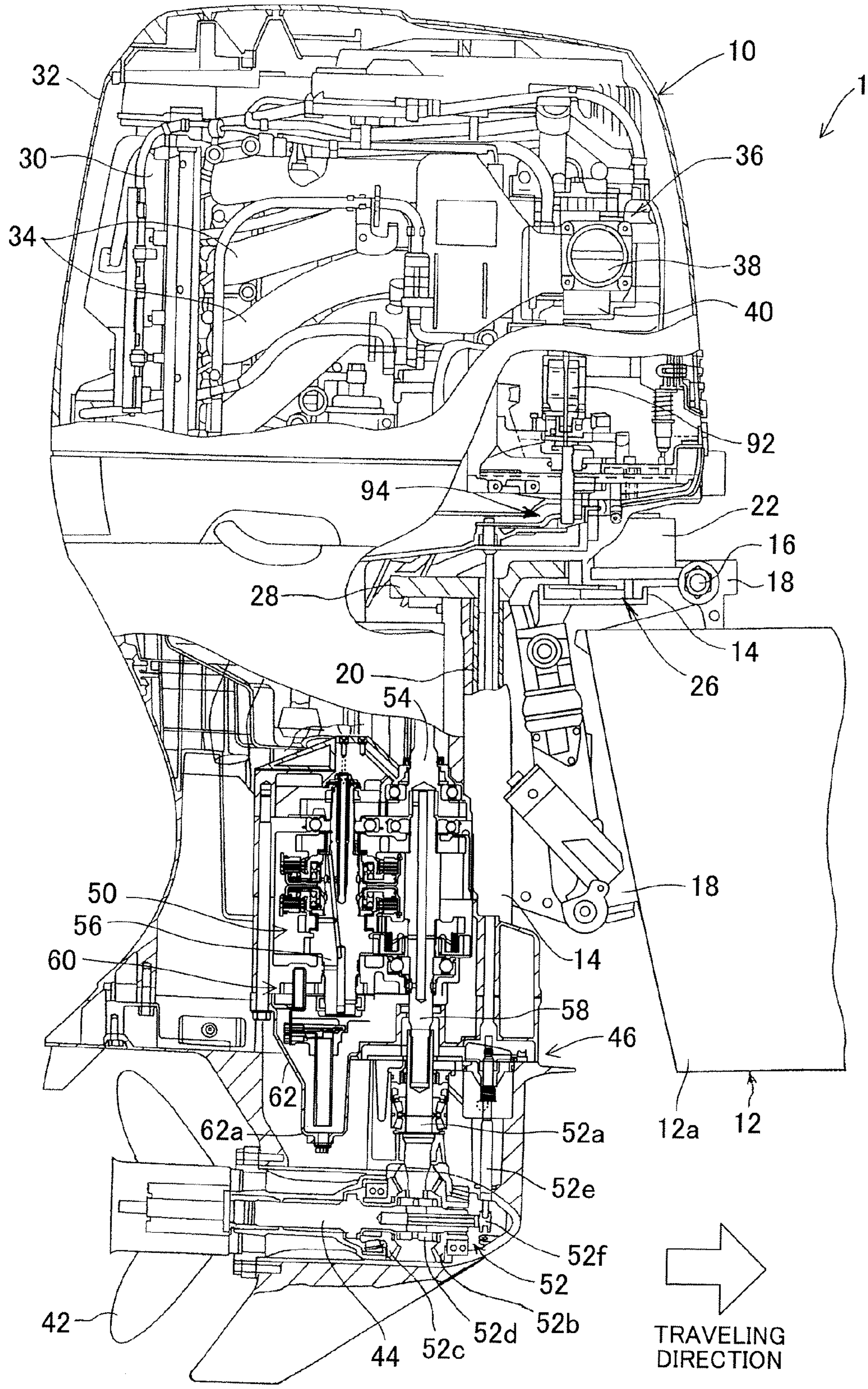
FIG. 2 is an enlarged sectional side view partially showing the outboard motor shown in FIG. 1.

FIG. 1 is an overall schematic view of an outboard motor control apparatus including a boat according to an embodiment of the invention. FIG. 2 is an enlarged sectional side view partially showing the outboard motor shown in FIG. 1 and FIG. 3 is an enlarged side view of the outboard motor.

Figure 3:
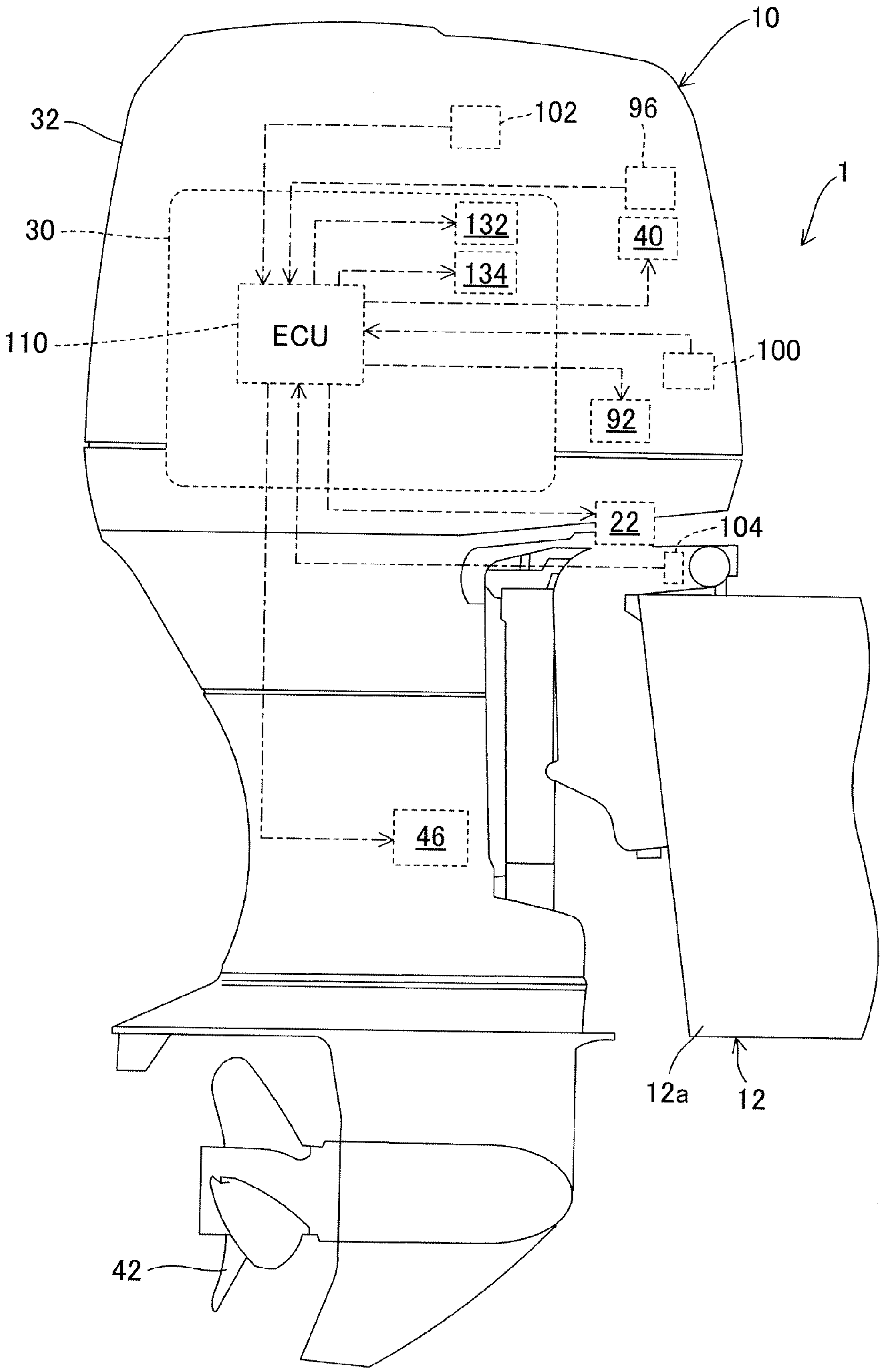
FIG. 3 is an enlarged side view of the outboard motor shown in FIG. 1.

In FIGS. 1 to 3, a symbol 1 indicates a boat or vessel whose hull 12 is mounted with the outboard motor 10. As clearly shown in FIG. 2, the outboard motor 10 is clamped (fastened)

to the stern or transom 12*a* of the boat 1, more precisely, to the stern 12*a* of the hull 12 through a swivel case 14, tilting shaft 16 and stern brackets 18.

An electric steering motor (actuator) 22 for operating a shaft 20 which is housed in the swivel case 14 to be rotatable about the vertical axis is installed near the swivel case 14. A rotational output of the steering motor 22 is transmitted to the shaft 20 via a speed reduction gear mechanism 26 and mount frame 28, whereby the outboard motor 10 is steered about the shaft 20 as a steering axis to the right and left directions (steered about the vertical axis).

An internal combustion engine (hereinafter referred to as the "engine") 30 is disposed in the upper portion of the outboard motor 10. The engine 30 comprises a spark-ignition, water-cooling gasoline engine with a displacement of 2,200 cc. The engine 30 is located above the water surface and covered by an engine cover 32.

An air intake pipe 34 of the engine 30 is connected to a throttle body 36. The throttle body 36 has a throttle valve 38 installed therein and an electric throttle motor (actuator) 40 for opening and closing the throttle valve 38 is integrally disposed thereto.

The output shaft of the throttle motor 40 is connected to the throttle valve 38 via a speed reduction gear mechanism (not shown). The throttle motor 40 is operated to open and close the throttle valve 38, thereby regulating the flow rate of the air sucked in the engine 30 to control a speed of the engine 30 (engine speed).

The outboard motor 10 further comprises a propeller shaft (power transmission shaft) 44 that is supported to be rotatable about the horizontal axis and attached with a propeller 42 at its one end to transmit power output of the engine 30 thereto, and a transmission (automatic transmission) 46 that is interposed at a location between the engine 30 and propeller shaft 44 and has a plurality of gear positions, i.e., first, second and third speeds.

The transmission 46 comprises a transmission mechanism 50 that is selectively changeable in gear positions and a shift mechanism 52 that can change a shift position among forward, reverse and neutral positions.

Figure 4:
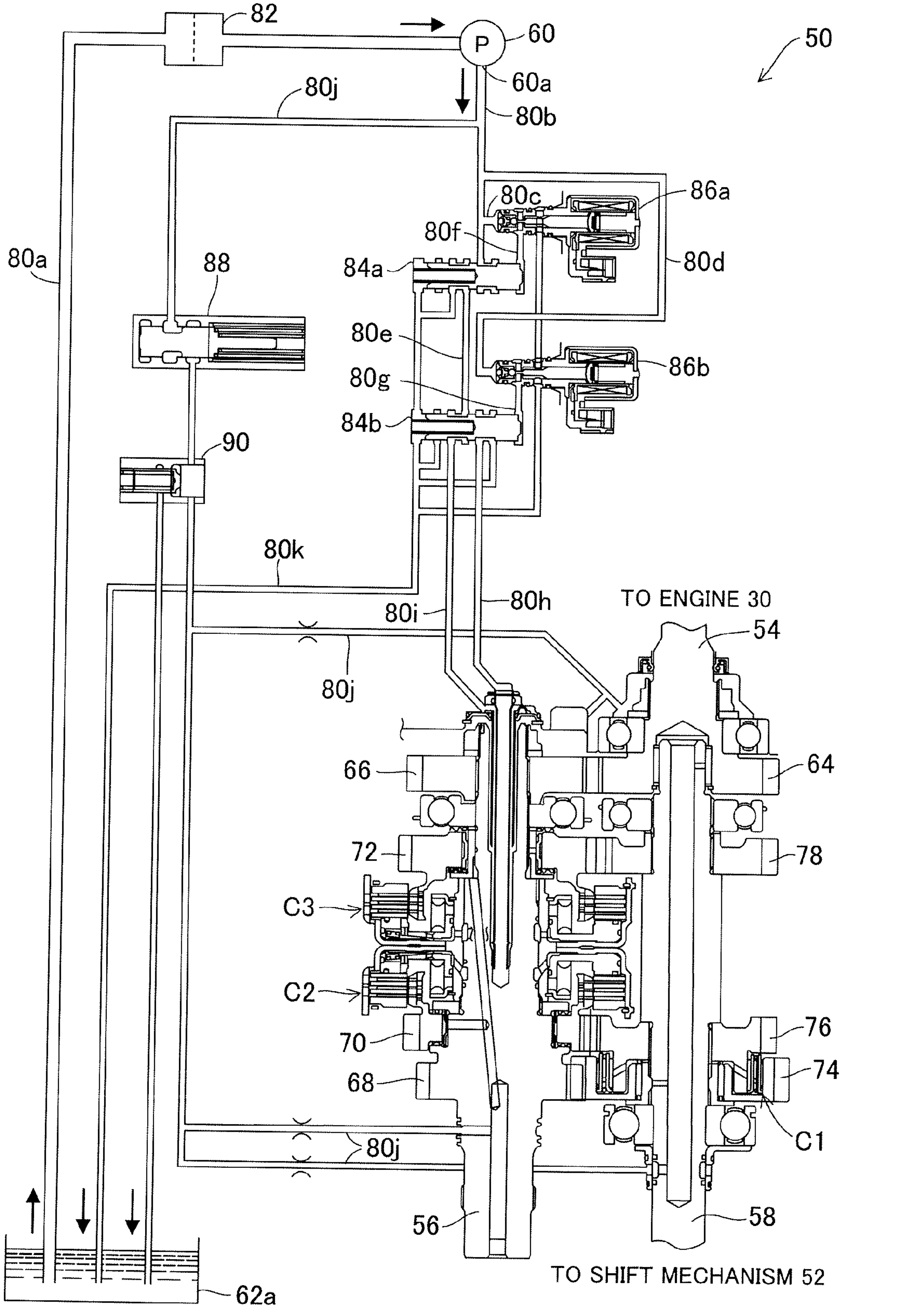
FIG. 4 is a hydraulic circuit diagram schematically showing a hydraulic circuit of a transmission mechanism shown in FIG. 2.

FIG. 4 is a hydraulic circuit diagram schematically showing a hydraulic circuit of the transmission mechanism 50.

As shown in FIGS. 2 and 4, the transmission mechanism 50 comprises a parallel-axis type transmission mechanism with distinct gear positions (ratios), which includes an input shaft (drive shaft) 54 connected to the crankshaft (not shown in the figures) of the engine 30, a countershaft 56 connected to the input shaft 54 through a transmission gear, and a first connecting shaft 58 connected to the countershaft 56 through several transmission gears. Those shafts 54, 56, 58 are installed in parallel.

The countershaft 56 is connected with a hydraulic pump (gear pump; shown in FIGS. 2 and 4) 60 that pumps up the operating oil (lubricating oil) and forwards it to transmission clutches and lubricated portions of the transmission mechanism 50 (explained later). The foregoing shafts 54, 56, 58, hydraulic pump 60 and the like are housed in a case 62 (shown only in FIG. 2). An oil pan 62*a* for receiving the operating oil is formed at the bottom of the case 62.

In the so-configured transmission mechanism 50, the gear installed on the shaft to be rotatable relative thereto is fixed on the shaft through the transmission clutch so that the transmission 46 is selectively changeable in the gear position to establish one of the three speeds (i.e., first to third speeds), and the output of the engine 30 is changed with the gear ratio determined by the established (selected) gear position (speed; gear) and transmitted to the propeller 42 through the shift mechanism 52 and propeller shaft 44. A gear ratio of the gear position (speed) is set to be the highest in the first speed and decreases as the speed changes to second and then third speed. Specifically, for instance, the first speed gear ratio is 2.2, the second speed gear ratio 2.0, and the third speed gear ratio 1.7.

The further explanation on the transmission mechanism 50 will be made. As clearly shown in FIG. 4, the input shaft 54 is supported with an input primary gear 64. The countershaft 56 is supported with a counter primary gear 66 to be meshed with the input primary gear 64, and also supported with a counter first-speed gear 68, counter second-speed gear 70 and counter third-speed gear 72.

The first connecting shaft 58 is supported with an output first-speed gear 74 to be meshed with the counter first-speed gear 68, an output second-speed gear 76 to be meshed with the counter second-speed gear 70, and an output third-speed gear 78 to be meshed with the counter third-speed gear 72.

In the above configuration, when the output first-speed gear 74 supported to be rotatable relative to the first connecting shaft 58 is brought into a connection with the first connecting shaft 58 through a first-speed clutch C1, the first speed (gear position) is established. The first-speed clutch C1 comprises a one-way clutch. When a second-speed or third-speed hydraulic clutch C2 or C3 (explained later) is supplied with hydraulic pressure so that the second or third speed (gear position) is established and the rotational speed of the first connecting shaft 58 becomes greater than that of the output first-speed gear 74, the first-speed clutch C1 makes the output first-speed gear 74 rotate idly (i.e., rotate without being meshed).

When the counter second-speed gear 70 supported to be rotatable relative to the countershaft 56 is brought into a connection with the countershaft 56 through the second-speed hydraulic clutch (transmission clutch) C2, the second speed (gear position) is established. Further, when the counter third-speed gear 72 supported to be rotatable relative to the countershaft 56 is brought into a connection with the countershaft 56 through the third-speed hydraulic clutch (transmission clutch) C3, the third speed (gear position) is established. The hydraulic clutches C2, C3 connect the gears 70, 72 to the countershaft 56 upon being supplied with the hydraulic pressure, while making the gears 70, 72 rotate idly when the hydraulic pressure is not supplied.

Thus the interconnections between the gears and shafts through the clutches C1, C2, C3 are performed by controlling hydraulic pressure supplied from the pump 60 to the hydraulic clutches C2, C3.

The further explanation will be made. When the oil pump 60 is driven by the engine 30, it pumps up the operating oil in the oil pan 62*a* to be drawn through an oil passage 80*a* and strainer 82 and forwards it from a discharge port 60*a* to a first switching valve 84*a* through an oil passage 80*b* and to first and second electromagnetic solenoid valves (linear solenoid valves) 86*a*, 86*b* through oil passages 80*c*, 80*d*.

The first switching valve 84*a* is connected to a second switching valve 84*b* through an oil passage 80*e*. Each of the valves 84*a*, 84*b* has a movable spool installed therein and the spool is urged by a spring at its one end (left end in the drawing) toward the other end. The valves 84*a*, 84*b* are connected on the sides of the other ends of the spools with the first and second solenoid valves 86*a*, 86*b* through oil passages 80*f*, 80*g*, respectively.

Upon being supplied with current (i.e., made ON), a spool housed in the first solenoid valve 86*a* is displaced to output the hydraulic pressure supplied from the pump 60 through the oil passage 80*c* to the other end side of the spool of the first switching valve 84*a*. Accordingly, the spool of the first switching valve 84*a* is displaced to its one end side, thereby forwarding the operating oil in the oil passage 80*b* to the oil passage 80*e*.

Similarly to the first solenoid valve 86*a*, upon being supplied with current (i.e., made ON), a spool of the second solenoid valve 86*b* is displaced to output the hydraulic pressure supplied from the pump 60 through the oil passage 80*d* to the other end side of the spool of the second switching valve 84*b*. Accordingly, the spool of the second switching valve 84*b* is displaced to its one end side, thereby forwarding the operating oil in the oil passage 80*e* to the second-speed hydraulic clutch C2 through the oil passage 80*h*. In contrast, when the second solenoid valve 86*b* is not supplied with current (made OFF) and no hydraulic pressure is outputted to the other end side of the second switching valve 84*b*, the operating oil in the oil passage 80*e* is forwarded to the third-speed hydraulic clutch C3 through the oil passage 80*i*.

When the first and second solenoid valves 86*a*, 86*b* are both made OFF, the hydraulic pressure is not supplied to the hydraulic clutches C2, C3 and hence, the output first-speed gear 74 and first connecting shaft 58 are interconnected through the first-speed clutch C1 so that the first speed is established.

When the first and second solenoid valves 86*a*, 86*b* are both made ON, the hydraulic pressure is supplied to the second-speed hydraulic clutch C2 and accordingly, the counter second-speed gear 70 and countershaft 56 are interconnected so that the second speed is established. Further, when the first solenoid valve 86*a* is made ON and the second solenoid valve 86*b* is made OFF, the hydraulic pressure is supplied to the third-speed hydraulic clutch C3 and accordingly, the counter third-speed gear 72 and countershaft 56 are interconnected so that the third speed is established.

Thus, one of the gear positions of the transmission 46 is selected (i.e., transmission control is conducted) by controlling ON/OFF of the first and second switching valves 84*a*, 84*b*.

Note that the operating oil (lubricating oil) from the hydraulic pump 60 is also supplied to the lubricated portions (e.g., the shafts 54, 56, 58, etc.) of the transmission 46 through the oil passage 80*b*, an oil passage 80*j*, a regulator valve 88 and a relief valve 90. Also, the first and second switching valves 84*a*, 84*b* and the first and second solenoid valves 86*a*, 86*b* are connected with an oil passage 80*k* adapted to relieve pressure.

The explanation on FIG. 2 is resumed. The shift mechanism 52 comprises a second connecting shaft 52*a* that is connected to the first connecting shaft 58 of the transmission mechanism 50 and installed parallel to the vertical axis to be rotatably supported, a forward bevel gear 52*b* and reverse bevel gear 52*c* that are connected to the second connecting shaft 52*a* to be rotated, a clutch 52*d* that can engage the propeller shaft 44 with either one of the forward bevel gear 52*b* and reverse bevel gear 52*c*, and other components.

The interior of the engine cover 32 is disposed with an electric shift motor (actuator) 92 that drives the shift mechanism 52. The output shaft of the shift motor 92 can be connected via a speed reduction gear mechanism 94 with the upper end of a shift rod 52*e* of the shift mechanism 52. When the shift motor 92 is operated, its output appropriately displaces the shift rod 52*e* and a shift slider 52*f* to move the clutch 52*d* to change the shift position among forward, reverse and neutral positions.

When the shift position is the forward or reverse position, the rotational output of the first connecting shaft 58 is transmitted via the shift mechanism 52 to the propeller shaft 44 to rotate the propeller 42 to generate the thrust in one of the directions making the boat 1 move forward or backward. The outboard motor 10 is equipped with a power source (not shown) such as a battery or the like attached to the engine 30 to supply operating power to the motors 22, 40, 92, etc.

As shown in FIG. 3, a throttle opening sensor 96 is installed near the throttle valve 38 and produces an output or signal indicative of opening of the throttle valve 38, i.e., throttle opening TH. A neutral switch 100 is installed near the shift rod 52*e* and produces an ON signal when the shift position of the transmission 46 is neutral and an OFF signal when it is forward or reverse. A crank angle sensor 102 is installed near the crankshaft of the engine 30 and produces a pulse signal at every predetermined crank angle.

The outputs of the foregoing sensor and switch are sent to an Electronic Control Unit (ECU) 110 disposed in the outboard motor 10. The ECU 110 comprises a microcomputer having a CPU, ROM, RAM and other devices and is installed in the engine cover 32 of the outboard motor 10.

As shown in FIG. 1, a steering wheel 114 is installed near a cockpit (the operator's seat) 112 of the hull 12 to be manipulated by the operator (not shown). A steering angle sensor 116 attached on a shaft (not shown) of the steering wheel 114 produces an output or signal corresponding to the steering angle applied or inputted by the operator through the steering wheel 114.

A remote control box 120 provided near the cockpit 112 is equipped with a shift/throttle lever (throttle lever) 122 installed to be manipulated by the operator. The lever 122 is attached to a rotary shaft (not shown) supported to be rotatable in the remote control box 120 so that it can be moved or swung in the front-back direction from the initial position. The lever 122 is used by the operator to input a forward/reverse change command and an engine speed regulation command including an acceleration/deceleration command (or instruction) for the engine 30.

A lever position sensor (throttle lever position change amount detector) 124 is installed in the remote control box 120 and produces an output or signal corresponding to a manipulation position (manipulation angle; hereinafter sometimes called the "manipulation amount") LVR of the lever 122 which is positioned by the operator, i.e., a rotational angle of the rotary shaft of the lever 122. The lever position sensor 124 comprises a rotational angle sensor such as a potentiometer.

Further, an inclination angle sensor 126 and boat speed sensor (speedometer for water; slip ratio detector) 130 are installed at appropriate positions in the hull 12. The inclination angle sensor 126 is equipped with a pendulum having a magnet and detects displacement of the pendulum from the vertical axis using a reed switch or the like (none of which are shown) to produce an output or signal indicative of an inclination angle $\alpha$ of an axis line of the hull 12 in the longitudinal direction relative to the traveling direction. More precisely, the inclination angle sensor 126 produces a Lo signal when the inclination angle $\alpha$ is below a predetermined angle $\alpha 1$ (described later) and a Hi signal when it is at or above the predetermined angle $\alpha 1$. The boat speed sensor 130 produces an output or signal corresponding to speed or velocity (boat speed; hereinafter sometimes called the "actual velocity") V of the boat 1. The outputs of the above sensors are also sent to the ECU 110.

Based on the inputted outputs, etc., the ECU 110 controls the operation of the motors 22, 92, while performing the transmission control of the transmission 46. Further, based on the output of the lever position sensor 124, i.e., based on the manipulation amount of the lever 122 manipulated by the operator, the ECU 110 controls the operation of the throttle motor 40 to open/close the throttle valve 38 to regulate the throttle opening TH, thereby conducting throttle opening control.

Furthermore, based on the inputted outputs, the ECU 110 determines a fuel injection amount and ignition timing of the engine 30 to supply fuel by the determined injection amount through an injector 132 (shown in FIG. 3) and ignite air-fuel mixture, which is composed of injected fuel and sucked air, through an ignition device 134 (shown in FIG. 3) at the determined ignition timing.

Thus, the outboard motor control apparatus according to the embodiment is a Drive-By-Wire type apparatus whose operation system (steering wheel 114, lever 122) has no mechanical connection with the outboard motor 10.

Figure 5:
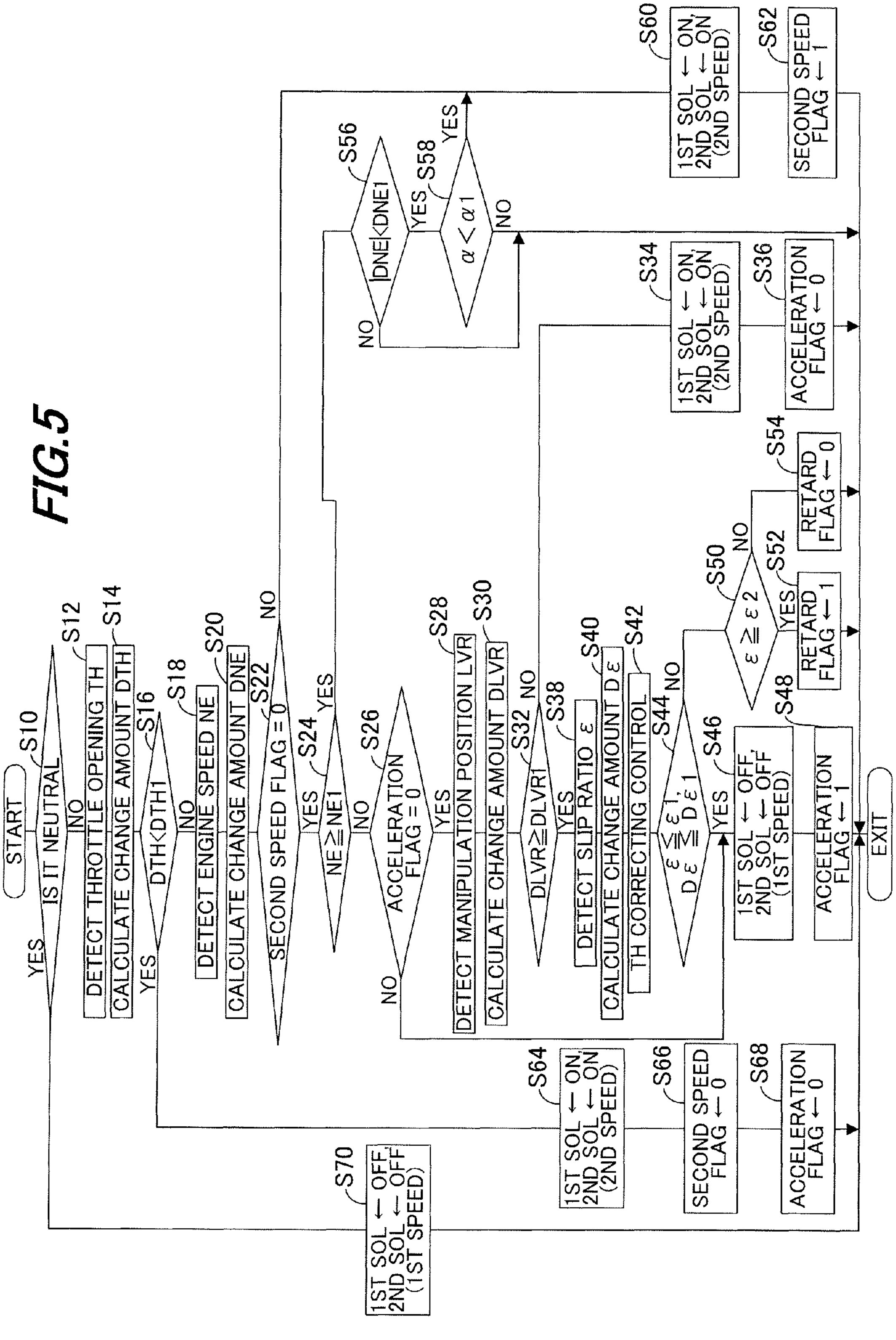
FIG. 5 is a flowchart showing transmission control operation, throttle opening control operation and ignition timing control operation by an electronic control unit shown in FIG. 1.

FIG. 5 is a flowchart showing the transmission control operation, throttle opening control operation and ignition timing control operation by the ECU 110. The illustrated program is executed by the ECU 110 at predetermined intervals, e.g., 100 milliseconds.

The program begins at S10, in which based on the output of the neutral switch 100, it is determined whether the shift position of the transmission 46 is the neutral position. When the result in S10 is negative, i.e., it is determined to be in gear, the program proceeds to S12, in which the throttle opening TH is detected or calculated from the output of the throttle opening sensor 96 and to S14, in which a change amount (variation) DTH of the detected throttle opening TH per unit time (e.g., 500 milliseconds) is detected or calculated.

The program proceeds to S16, in which it is determined whether the deceleration is instructed to the engine 30 by the operator, i.e., whether the engine 30 is in the operating condition to decelerate the boat 1. Specifically, when the change amount DTH is less than a threshold value DTH1 set to a negative value (e.g., −0.5 degree), the throttle valve 38 is determined to be operated in the closing direction (i.e., the deceleration is instructed to the engine 30).

When the result in S16 is negative, the program proceeds to S18, in which the output pulses of the crank angle sensor 102 are counted to detect or calculate the engine speed NE and to S20, in which a change amount (variation) DNE of the engine speed NE is detected or calculated. The change amount DNE is obtained by subtracting the engine speed NE detected in the present program loop from that detected in the previous program loop.

Next, the program proceeds to S22, in which it is determined whether the bit of an after-acceleration second-speed changed flag (hereinafter called the "second speed flag") is 0. The bit of this flag is set to 1 when the gear position is changed from the first speed to the second speed after the acceleration is completed (explained later), and otherwise, reset to 0.

Since the initial value of the second speed flag is 0, the result in S22 in the first program loop is generally affirmative and the program proceeds to S24, in which it is determined whether the engine speed NE is equal to or greater than a predetermined speed NE1. The predetermined speed NE1 will be explained later.

Since the engine speed NE is less than the predetermined speed NE1 generally in a program loop immediately after the engine start, the result in S24 is negative and the program proceeds to S26, in which it is determined whether the bit of an acceleration determining flag (explained later; indicated by "acceleration flag" in the drawing) is 0. Since the initial value of this flag is also 0, the result in S26 in the first program loop is generally affirmative and the program proceeds to S28.

In S28, the manipulation position (manipulation amount) LVR of the lever 122 is detected or calculated from the output of the lever position sensor 124 and in S30, a change amount (variation) DLVR of the manipulation position LVR in the opening direction of the throttle valve 38 per unit time (e.g., 500 milliseconds) is detected or calculated. The change amount DLVR exhibits a positive value when, upon the manipulation of the lever 122 by the operator, the lever position is changed in the direction to open the throttle valve 38 and a negative value when it is changed in the direction to close the throttle valve 38.

Next the program proceeds to S32, in which it is determined whether the acceleration (precisely, the rapid acceleration) is instructed to the engine 30 by the operator, i.e., whether the engine 30 is in the operating condition to accelerate the boat 1 (rapidly). This determination is made based on the change amount DLVR of the manipulation position of the lever 122. Specifically, when the change amount DLVR is equal to or greater than a prescribed value (prescribed manipulation position change amount) DLVR1, it is determined that the acceleration is instructed by the operator. The prescribed value DLVR1 is set as a criterion (e.g., 0.5 degree) for determining whether the acceleration is instructed to the engine 30.

When the result in S32 is negative, i.e., it is determined that neither the acceleration nor the deceleration is instructed to the engine 30, the program proceeds to S34, in which the first and second solenoid valves 86*a*, 86*b* (indicated by "1ST SOL," "2ND SOL" in the drawing) are both made ON to select the second speed in the transmission 46, and to S36, in which the bit of the acceleration determining flag is reset to 0.

On the other hand, when the result in S32 is affirmative, the program proceeds to S38, in which a slip ratio $\epsilon$ indicating the rotating condition of the propeller 42 is detected or calculated and to S40, in which a change amount (variation) D$\epsilon$ of the slip ratio $\epsilon$ per unit time (e.g., 500 milliseconds) is detected or calculated. The slip ratio $\epsilon$ is calculated based on theoretical velocity Va and actual velocity V of the boat 1, using Equation (1) as follows:

$$\text{Slip ratio } \epsilon = (\text{Theoretical velocity Va(Km/h)} - \text{Actual velocity V(Km/h)}) / \text{Theoretical velocity Va(Km/h)} \quad \text{Equation (1)}$$

In Equation (1), the actual velocity V is obtained based on the output of the boat speed sensor 130. The theoretical velocity Va is calculated based on the operating condition of the engine 30 and transmission 46 and specification of the propeller 42, as can be seen in the following Equation (2):

$$\text{Theoretical velocity Va(Km/h)} = (\text{Engine speed NE(rpm)} \times \text{Propeller pitch(inch)} \times 60 \times 2.54 \times 10^{-5}) / (\text{Gear ratio of gear position}) \quad \text{Equation (2)}$$

In Equation (2), the propeller pitch is a value indicating a theoretical distance by which the boat 1 proceeds per one rotation of the propeller 42. The gear ratio of gear position is a gear ratio of the currently-selected gear position in the transmission 46, e.g., is 2.0 in the second speed, as mentioned above. The value of 60 is used for converting the engine speed NE for one minute into that for one hour, and the value of $2.54 \times 10^{-5}$ is used for converting a unit of the propeller pitch from inch to kilometer.

Then the program proceeds to S42, in which the throttle opening TH of the engine 30 is controlled to suppress the increase in the slip ratio $\epsilon$ of the propeller 42. Specifically, when the acceleration is instructed to the engine 30, as mentioned above, the propeller 42 tends to be rotated idly because it draws in air bubbles generated around the propeller 42 due to the increase in the rotational speed, and therefore the slip ratio ε rises so that the grip force becomes relatively small. To cope with it, in S42, the throttle opening TH is appropriately corrected to suppress the increase in the slip ratio ε.

Figure 6:
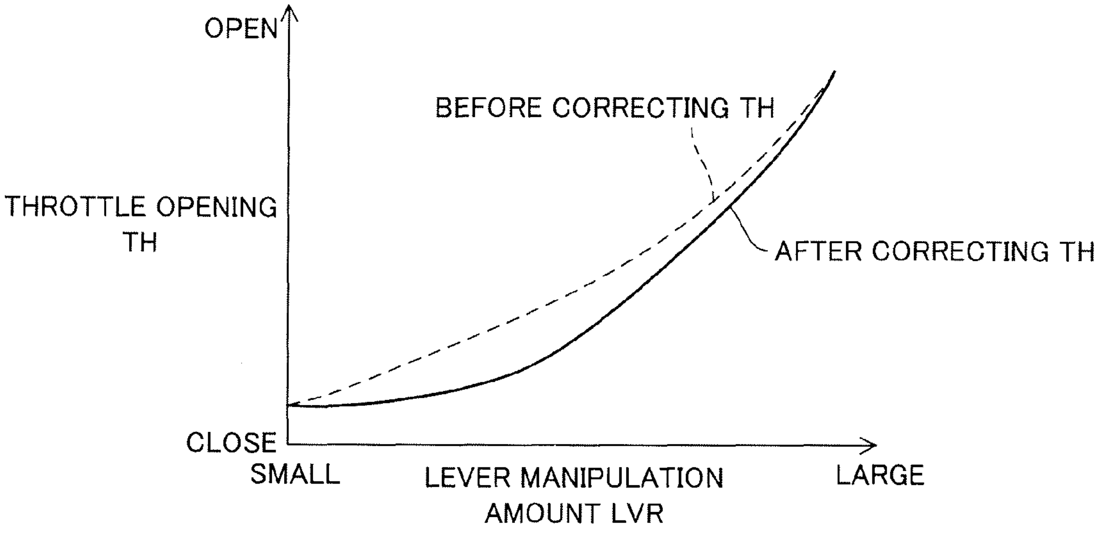
FIG. 6 is an explanatory graph showing the characteristics of throttle opening with respect to a manipulation amount of a throttle lever, which is used in the operation of the FIG. 5 flowchart.

FIG. 6 is an explanatory graph showing the characteristics of the throttle opening TH with respect to the manipulation amount (position) LVR of the lever 122. In FIG. 6, the characteristics before correcting the throttle opening TH are indicated by a dashed line and those after correction are indicated by a solid line.

As shown, in the process of S42, the operation of the throttle motor 40 is controlled so that a rate of change of the throttle opening TH with respect to the manipulation amount LVR of the lever 122 is decreased (the increase in the throttle opening TH is slowed). As a result, when the acceleration is instructed to the engine 30, i.e., when the manipulation amount LVR is increased, the throttle valve 38 is opened more slowly compared to before the correction is applied, thereby avoiding the sharp increase in the engine speed NE, i.e., in the rotational speed of the propeller 42. Consequently, it becomes possible to prevent the air bubbles from being generated around the propeller 42 and suppress the increase in the slip ratio ε.

Next the program proceeds to S44, in which it is determined whether the slip ratio ε is equal to or less than a first predetermined value ε1 and the change amount Dε of the slip ratio ε is equal to or less than a prescribed value (prescribed slip ratio change amount) Dε1. The first predetermined value ε1 is set to a relatively small value (e.g., 0.3) as a criterion for determining that, when the slip ratio ε is below this criterion value, the grip force is relatively large. The prescribed value Dε1 is set to 0, so that the latter determination above is made for checking as to whether the change amount Dε is 0 or a negative value. In other words, the process of S44 is conducted to determine whether the slip ratio ε of the propeller 42 is changed in the decreasing direction and whether the grip force becomes relatively large.

When the result in S44 is affirmative, the program proceeds to S46, in which the first and second solenoid valves 86*a*, 86*b* are both made OFF to change the gear position (shift down the gear) from the second speed to the first speed. As a result, the output torque of the engine 30 is amplified through the transmission 46 (more precisely, the transmission mechanism 50) which has been shifted down to the first speed, and transmitted to the propeller 42 via the propeller shaft 44, thereby improving the acceleration performance. When the gear position is changed to the first speed in S46, the foregoing control to correct the throttle opening TH is finished and the normal control, i.e., the control of the throttle opening TH based on the characteristics indicated by the dashed line in FIG. 6 is resumed.

Next the program proceeds to S48, in which the bit of the acceleration determining flag is set to 1. Specifically, the bit of this flag is set to 1 when the acceleration is determined to be instructed to the engine 30 and the transmission 46 is changed from the second speed to the first speed, and otherwise, reset to 0. Upon setting of the bit of the acceleration determining flag to 1, the result in S26 in the next and subsequent loops becomes negative and the program skips S28 to S44.

Thus, the transmission 46 is set in the second speed during a period from when the engine 30 is started until the acceleration is instructed and the slip ratio ε meets the aforementioned conditions (i.e., during the normal operation). With this, it becomes possible to ensure the usability of the outboard motor 10 similarly to that of an outboard motor having no transmission.

When the result in S44 is negative, the program proceeds to S50, in which it is determined whether the slip ratio ε is equal to or greater than a second predetermined value ε2 set greater than the first predetermined value ε1. The second predetermined value ε2 is set as a criterion (e.g., 0.5) for determining that, when the slip ratio ε is at or above this criterion value, the grip force of the propeller 42 is relatively small. Specifically, the process of S50 is conducted to determine whether the slip ratio ε is increased and the grip force is decreased despite the fact that the throttle opening TH is corrected in S42.

When the result in S50 is affirmative, the program proceeds to S52, in which the bit of an ignition timing retard flag (initial value 0; indicated by "retard flag" in the drawing) is set to 1. When the bit of this flag is set to 1, in another program which is not shown, retard control for retarding the ignition timing of the engine 30 is conducted, in other words, the ignition timing calculated based on the engine speed NE, etc., is retarded by a preset angle (e.g., 5 degrees) to decrease or reduce the output of the engine 30.

In response to the decrease in the engine output, the grip force of the propeller 42 is increased instantaneously and the slip ratio ε is decreased to a value below the second predetermined value ε2. Accordingly, the result in S50 becomes negative and the program proceeds to S54, in which, the bit of the ignition timing retard flag is reset to 0 to stop the foregoing retard control and conduct the normal ignition timing control.

After the transmission 46 is changed to the first speed in S46, when the engine speed NE is gradually increased and the acceleration through the torque amplification in the first speed is completed (i.e., the acceleration range is saturated), the engine speed NE reaches the predetermined speed NE1. Subsequently, in the next program loop, the result in S24 becomes affirmative and the program proceeds to S56 onward. Thus the predetermined speed NE1 is set to a relatively high value (e.g., 6000 rpm) as a criterion for determining whether the acceleration in the first speed is completed.

In S56, it is determined whether the engine speed NE is stable, i.e., the engine 30 is stably operated. Specifically, when an absolute value of the change amount DNE of the engine speed NE is less than a threshold value DNE1, the engine speed NE is determined to be stable. The threshold value DNE1 is set as a criterion (e.g., 500 rpm) for determining whether the engine speed NE is stable, i.e., the change amount DNE is relatively small.

When the result in S56 is negative, the program is terminated with the first speed being maintained, and when the result is affirmative, the program proceeds to S58, in which it is determined whether the hull 12 is planing. This determination is made by checking as to whether the inclination angle α of the axis line of the hull 12 in the longitudinal direction relative to the traveling direction is less than a predetermined angle α1 based on the output (Hi or Lo signal) of the inclination angle sensor 126.

To be more specific, when the acceleration is instructed to the engine 30 and the boat speed is increased, a bow of the hull 12 is lifted up and the stern 12*a* thereof is sunk down (the boat speed lies in the so-called "hump" region). Under this condition, the inclination angle α of the boat 1 becomes equal to or greater than the predetermined angle α1. After that, when the acceleration is completed and the boat speed becomes stable, it makes the bow move down and the boat 1 is planing. More exactly, the inclination angle α of the boat 1 is decreased to a value below the predetermined angle α1.

Thus, in S58, when the inclination angle α is less than the predetermined angle α1, it is determined that the acceleration has been completed and the boat 1, i.e., hull 12 is planing. The predetermined angle α1 is set to a relatively small value (e.g., 5 degrees) as a criterion for determining whether the hull 12 is planing.

When the result in S58 is negative, the program is immediately terminated and when the result is affirmative, the program proceeds to S60, in which the first and second solenoid valves 86*a*, 86*b* are both made ON to change the gear position (shift up the gear) from the first speed to the second speed and to S62, in which the bit of the second speed flag is set to 1. Consequently the rotational speed of the second connecting shaft 52*a* and that of the propeller shaft 44 are increased, so that the boat speed reaches the maximum speed (in a range of the engine performance), thereby improving the speed performance.

Upon setting of the bit of the second speed flag to 1 in S62, the result in S22 in the next and subsequent loops becomes negative and the program proceeds to S60 and S62 described above. Further, when the result in S16 is affirmative, the program proceeds to S64, in which the first and second solenoid valves 86*a*, 86*b* are both made ON to change the gear position to the second speed and to S66 and S68, in which the bits of the second speed flag and acceleration determining flag are both reset to 0.

When the lever 122 is manipulated by the operator to change the shift position of the transmission 46 to the neutral position, the result in S10 is affirmative and the program proceeds to S70, in which the first and second solenoid valves 86*a*, 86*b* are both made OFF to change the gear position from the second speed to the first speed.

Figure 7:
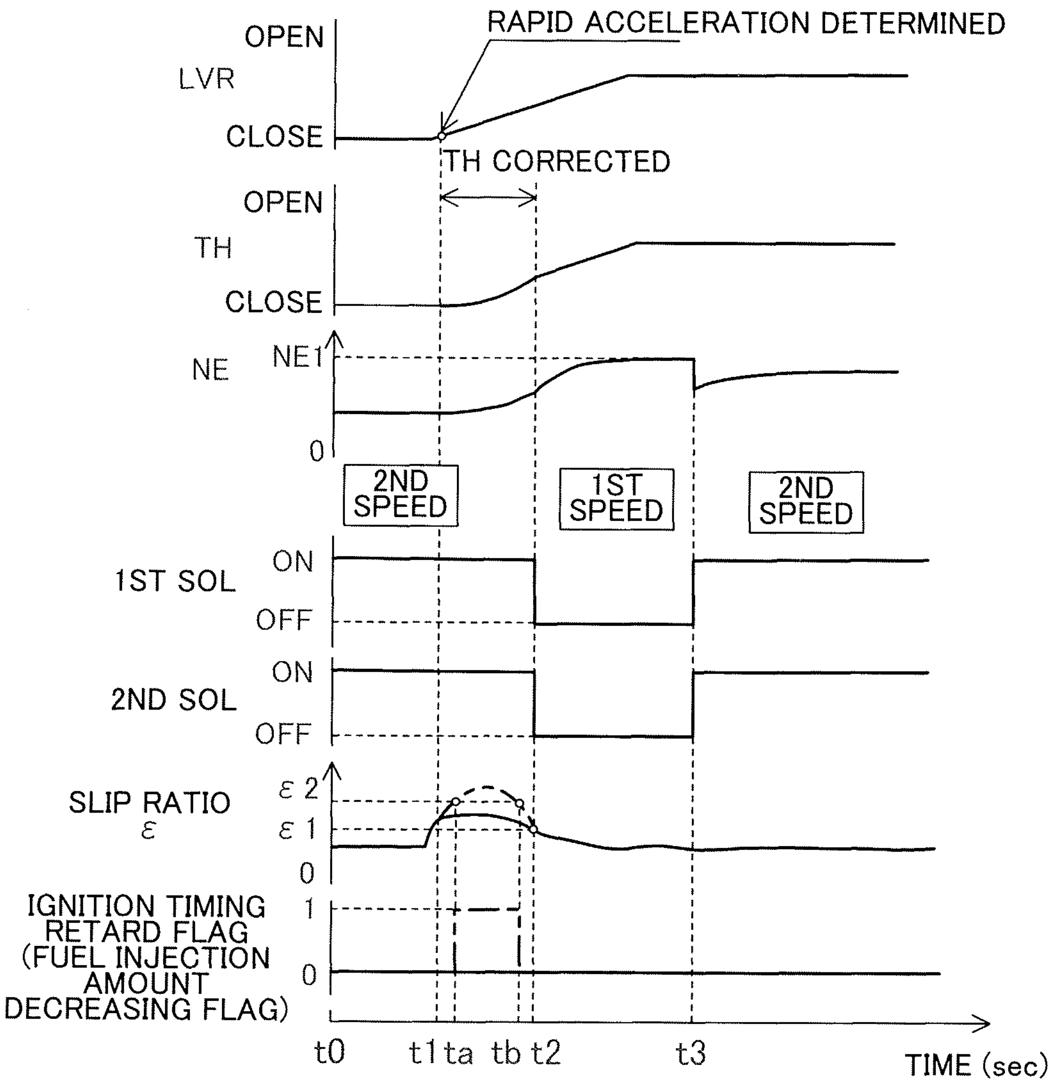
FIG. 7 is a time chart for explaining the operation of the FIG. 5 flowchart.

FIG. 7 is a time chart for explaining part of the above operation.

As shown in FIG. 7, in the normal operation from the time t0 to t1, the transmission 46 is set in the second speed (S34). At the time t1, when the change amount DLVR of the manipulation position LVR of the lever 122 is equal to or greater than the prescribed value DLVR1, the acceleration is determined to be instructed to the engine 30 (S32). Since, immediately after the acceleration is started, the propeller 42 draws in air bubbles generated therearound and the slip ratio ε is increased accordingly, at the time t1, the control to correct the throttle opening TH of the engine 30 is started to suppress the increase in the slip ratio ε (S42).

After that, the slip ratio ε is gradually decreased. When, at the time t2, the slip ratio ε becomes at or below the first predetermined value ε1 and the change amount Dε becomes at or below the prescribed value Dε1, the transmission 46 is changed from the second speed to the first speed (S46). At this time, the control to correct the throttle opening TH is finished.

The engine speed NE is gradually increased and when, at the time t3, it is determined to be equal to or greater than the predetermined speed NE1 (S24) and also the hull 12 is determined to be planing (S58), the gear position is changed from the first speed to the second speed (S60).

As indicated by imaginary lines for a period between the time t1 and t2, in the case where the slip ratio ε is determined to be equal to or greater than the second predetermined value ε2 at the time ta despite the fact that the throttle opening TH is corrected to suppress the increase in the slip ratio ε (S50), the bit of the ignition timing retard flag is set to 1 to decrease the engine output (S52).

In response to the decrease in the engine output, the grip force is increased, i.e., the slip ratio ε is decreased. When the slip ratio ε is determined to be below the second predetermined value ε2 at the time tb (S50), the bit of the ignition timing retard flag is reset to 0 to stop decreasing the engine output (S54).

As mentioned in the foregoing, the first embodiment is configured to determine whether the acceleration is instructed to the engine 30 by the operator when the gear position is the second speed, detect the slip ratio ε of the propeller 42 based on the theoretical velocity Va and actual velocity V of the boat 1, control the throttle opening TH of the engine 30 to suppress the increase in the detected slip ratio ε when the acceleration is determined to be instructed, and change the gear position from the second speed to the first speed when the slip ratio ε is equal to or less than the first predetermined value ε1 and the change amount Dε of the slip ratio is equal to or less than the prescribed slip ratio change amount (prescribed value) Dε1. With this, it becomes possible to appropriately control the operation of the engine 30 and transmission 46 during acceleration, thereby improving the acceleration performance of immediately after the acceleration is started.

Specifically, when the acceleration is determined to be instructed, the throttle opening TH is controlled to suppress the increase in the slip ratio ε of the propeller 42, i.e., suppress the decrease in the grip force of the propeller 42. Also, when the slip ratio ε is at or below the first predetermined value ε1 and the change amount Dε is at or below the prescribed value Dε1, i.e., at the right time when the slip ratio ε is decreased to a relatively small value (the grip force is increased), the gear position can be changed from the second speed to the first speed. As a result, the output torque of the engine 30 is amplified through the transmission 46 and transmitted to the propeller 42 and consequently, the boat speed starts increasing immediately, thereby improving the acceleration performance of the outboard motor 10 of immediately after the acceleration is started.

Further, it is configured to reduce or decrease the engine output when the acceleration is determined to be instructed and the detected slip ratio ε is equal to or greater than the second predetermined value ε2 set greater than the first predetermined value ε1. In other words, in the case where the slip ratio ε is relatively large despite the fact that the throttle opening TH is controlled to suppress the increase in the slip ratio ε, the engine output is instantaneously decreased. As a result, it becomes possible to decrease the slip ratio ε, i.e., increase the grip force and the gear position can be changed from the second speed to the first speed at the right time when the slip ratio ε has become relatively small. With this, it becomes possible to appropriately control the operation of the engine 30 and transmission 46 during acceleration, thereby further improving the acceleration performance of immediately after the acceleration is started.

Since it is configured to reduce or decrease the engine output by controlling the ignition timing of the engine 30, when the acceleration is determined to be instructed and the slip ratio ε is equal to or greater than the second predetermined value ε2, the ignition timing can be retarded for example, thereby reliably decreasing the engine output.

Since it is configured to detect the change amount DLVR of the manipulation position LVR of the lever 122 in the direction to open the throttle valve 38 and determine that the acceleration is instructed by the operator when the detected change amount DLVR is equal to or greater than the prescribed manipulation position change amount (prescribed value) DLVR1, it becomes possible to accurately determine that the acceleration is instructed.

An outboard motor control apparatus according to a second embodiment of the invention will be explained.

Explaining with focus on the points of difference from the first embodiment, in the second embodiment, the engine output is decreased by controlling the fuel injection amount of the engine 30 in place of the ignition timing.

Figure 8:
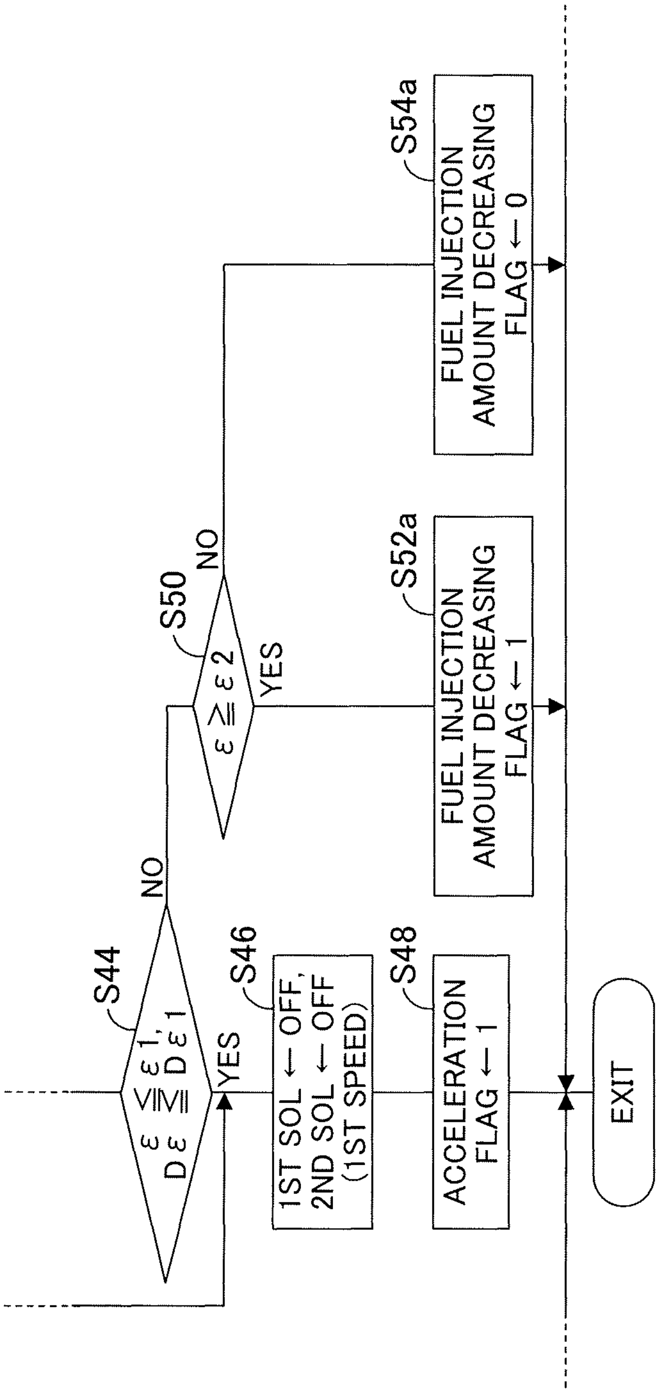
FIG. 8 is a flowchart partially showing transmission control operation, throttle opening control operation and fuel injection amount control operation by an electronic control unit of an outboard motor control apparatus according to a second embodiment of the invention, with focus on points of difference from the FIG. 5 flowchart.

FIG. 8 is a flowchart partially showing transmission control operation, throttle opening control operation and fuel injection amount control operation by the ECU 110 according to the second embodiment, with focus on points of difference from the FIG. 5 flowchart. Note that steps of the same process as in the first embodiment are given with the same step numbers and their explanation will be omitted.

As shown in FIG. 8, the steps up to S50 are processed the same as in the first embodiment. When the result in S50 is affirmative, the program proceeds to S52a, the bit of a fuel injection amount decreasing flag (initial value 0) is set to 1. When the bit of this flag is set to 1, in another program which is not shown, control for decreasing the fuel injection amount to be supplied to the engine 30 is conducted, specifically, the fuel injection amount calculated based on the engine speed NE, etc., is decreased by a preset amount to decrease or reduce the output of the engine 30. In other words, the process of S52a amounts to the operation to decrease the engine output, similarly to S52 in the first embodiment.

When the result in S50 is negative, the program proceeds to S54a, in which the bit of the fuel injection amount decreasing flag is reset to 0, whereby this control is stopped or not conducted and normal fuel injection control is conducted. In the second embodiment, the timing to set the fuel injection amount decreasing flag to 1 or 0 is the same as in the case of the ignition timing retard flag in FIG. 7.

Thus the second embodiment is configured to decrease the engine output using the fuel injection amount of the engine 30. With this, when the acceleration is determined to be instructed and the slip ratio ϵ is equal to or greater than the second predetermined value ϵ2, the fuel injection amount can be decreased for example, thereby reliably decreasing the engine output.

The remaining configuration and the effects is the same as that in the first embodiment.

As stated above, the first and second embodiments are configured to have an apparatus and a method for controlling operation of an outboard motor 10 adapted to be mounted on a stern 12a of a boat 1 and having an internal combustion engine 30 to power a propeller 42 through a drive shaft (input shaft) 54 and a propeller shaft 44, and a transmission 46 that is installed at a location between the drive shaft 54 and the propeller shaft 44, the transmission 46 being selectively changeable in gear position to establish speeds including at least a first speed and a second speed and transmitting power of the engine 30 to the propeller 42 with a gear ratio determined by established speed, comprising: an acceleration instruction determiner (ECU 110, S32) adapted to determine whether acceleration is instructed to the engine 30 by an operator when the gear position is second speed; a slip ratio detector (boat speed sensor 130, ECU 110, S38) adapted to detect a slip ratio ϵ of the propeller 42 based on theoretical velocity Va and actual velocity V of the boat 1; a throttle opening controller (ECU 110, S42) adapted to control a throttle opening TH of the engine 30 to suppress increase in the detected slip ratio ϵ when the acceleration is determined to be instructed; a transmission controller (ECU 110, S44, S46) adapted to control the transmission 46 to change the gear position from the second speed to the first speed when the throttle opening TH is controlled by the throttle opening controller, the detected slip ratio ϵ is equal to or less than a first predetermined value ϵ1 and a change amount Dϵ of the slip ratio is equal to or less than a prescribed slip ratio change amount (prescribed value) Dϵ1.

The apparatus and method further include an engine output reducer (ECU 110, S50, S52, S52a) adapted to reduce an output of the engine 30 when the acceleration is determined to be instructed and the detected slip ratio ϵ is equal to or greater than a second predetermine value ϵ2.

In the apparatus and method, the engine output reducer reduces the output of the engine 30 by controlling one of ignition timing and a fuel injection amount of the engine (S52, S52a).

The apparatus and method further include a throttle lever (shift/throttle lever) 122 adapted to open and close a throttle valve 38 of the engine 30 upon manipulation by the operator; and a throttle lever position change amount detector (lever position sensor 124, ECU 110, S30) adapted to detect a change amount DLVR of a manipulation position LVR of the throttle lever 122 in a direction to open the throttle valve 38, and the acceleration instruction determiner determines that the acceleration is instructed by the operator when the detected change amount DLVR of the manipulation position of the throttle lever is equal to or greater than a prescribed manipulation position change amount (prescribed value) DLVR1 (S32).

It should be noted that, although the ignition timing is retarded in the first embodiment and the fuel injection amount is decreased in the second embodiment for decreasing the engine output, the both can be conducted together and also the ignition cut-off and/or fuel cut-off may be utilized to reduce the engine output. In that sense, it is described in claim 2 as It should also be noted that the actual velocity V of the boat 1 can be detected by, in place of the boat speed sensor 130, a GPS (Global Positioning System) for instance.

It should be noted that, although the outboard motor is exemplified above, this invention can be applied to an inboard/outboard motor equipped with a transmission. Further, although the first and second predetermined values ϵ1, ϵ2, prescribed value Dϵ1, prescribed value DLVR1, displacement of the engine 30 and other values are indicated with specific values in the foregoing, they are only examples and not limited thereto.

Japanese Patent Application No. 2010-123292, filed on May 28, 2010 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling operation of an outboard motor mounted on a stern of a boat and having an internal combustion engine to power a propeller through a drive shaft and a propeller shaft, and a transmission that is installed at a location between the drive shaft and the propeller shaft, the transmission being selectively changeable in gear position to establish speeds including at least a first speed and a second speed and transmitting power of the engine to the propeller with a gear ratio determined by established speed, comprising:

a throttle lever which opens and closes a throttle valve of the engine upon manipulation by an operator;

an acceleration instruction determiner that determines whether acceleration is instructed to the engine by the operator when the gear position is second speed;

a slip ratio detector that detects a slip ratio of the propeller based on theoretical velocity and actual velocity of the boat;

a throttle opening controller that controls a rate of change of throttle opening of the engine in accordance with characteristics before correcting the throttle opening with respect to the manipulation of the throttle lever by the operator;

and a transmission controller that controls the transmission to change the gear position from the second speed to the first speed when the detected slip ratio is equal to or less than a first predetermined value and a change amount of the slip ratio is equal to or less than a prescribed slip ratio change amount while the throttle opening is controlled by the throttle opening controller, wherein the throttle opening controller controls the rate of change of the throttle opening of the engine in accordance with characteristics after correction with respect to the manipulation of the throttle lever by the operator after the acceleration is determined to be instructed, and the characteristics after correction are set to decrease the rate of change of the throttle opening compared to the characteristics before correcting the throttle opening, so that the throttle opening controller controls the rate of change of the throttle opening to suppress an increase in the detected slip ratio after the acceleration is determined to be instructed.

2. The apparatus according to claim 1, further including:

an engine output reducer that reduces an output of the engine when the acceleration is determined to be instructed and the detected slip ratio is equal to or greater than a second predetermine value.

3. The apparatus according to claim 2, wherein the engine output reducer reduces the output of the engine by controlling one of ignition timing and a fuel injection amount of the engine.

4. The apparatus according to claim 1, further including:

a throttle lever position change amount detector that detects a change amount of a manipulation position of the throttle lever in a direction to open the throttle valve, and the acceleration instruction determiner determines that the acceleration is instructed by the operator when the detected change amount of the manipulation position of the throttle lever is equal to or greater than a prescribed manipulation position change amount.

5. A method for controlling operation of an outboard motor adapted to be mounted on a stern of a boat and having an internal combustion engine to power a propeller through a drive shaft and a propeller shaft, and a transmission that is installed at a location between the drive shaft and the propeller shaft, the transmission being selectively changeable in gear position to establish speeds including at least a first speed and a second speed and transmitting power of the engine to the propeller with a gear ratio determined by established speed, comprising the steps of:

opening and closing a throttle valve of the engine upon manipulation of a throttle lever by an operator;

determining whether acceleration is instructed to the engine by an operator when the gear position is second speed;

detecting a slip ratio of the propeller based on theoretical velocity and actual velocity of the boat;

controlling a rate of change of a throttle opening of the engine in accordance with characteristics before correcting the throttle opening with respect to the manipulation of the throttle lever by an operator;

and controlling the transmission to change the gear position from the second speed to the first speed when the detected slip ratio is equal to or less than a first predetermined value and a change amount of the slip ratio is equal to or less than a prescribed slip ratio change amount while the throttle opening is controlled by the step of controlling the throttle opening, wherein the step of controlling a rate of change of the throttle opening controls the rate of change of the throttle opening of the engine in accordance with characteristics after correction with respect to the manipulation of the throttle lever by the operator after the acceleration is determined to be instructed, and the characteristics after correction are set to decrease the rate of change of the throttle opening compared to the characteristics before correcting the throttle opening, so that the step of controlling the rate of change of the throttle opening controls the rate of change of the throttle opening of the engine to suppress an increase in the detected slip ratio after the acceleration is determined to be instructed.

6. The method according to claim 5, further including the step of:

reducing an output of the engine when the acceleration is determined to be instructed and the detected slip ratio is equal to or greater than a second predetermine value.

7. The method according to claim 6, wherein the step of reducing reduces the output of the engine by controlling one of ignition timing and a fuel injection amount of the engine.

8. The method according to claim 5, further including the step of:

detecting a change amount of a manipulation position of the throttle lever in a direction to open the throttle valve, and the step of determining determines that the acceleration is instructed by the operator when the detected change amount of the manipulation position of the throttle lever is equal to or greater than a prescribed manipulation position change amount.

* * * * *